INVENTOR.
R.L. McINTIRE
J.W. BEGLEY
BY
Hudson and Young
ATTORNEYS

Feb. 21, 1956   J. W. BEGLEY ET AL   2,735,880
PEBBLE HEAT EXCHANGER AND PROCESS
Filed July 31, 1952   2 Sheets-Sheet 2

INVENTOR.
R. L. McINTIRE
J. W. BEGLEY
BY
Hudson and Young
ATTORNEYS

United States Patent Office 2,735,880
Patented Feb. 21, 1956

2,735,880

PEBBLE HEAT EXCHANGER AND PROCESS

John W. Begley and Robert L. McIntire, Bartlesville, Okla., assignors to Phillips Petroleum Company, a corporation of Delaware Application July 31, 1952, Serial No. 301,818

17 Claims. (Cl. 260—679)

This invention relates to pebble heat exchangers. In one of its more specific aspects, it relates to improved pebble heater apparatus. In another of its more specific aspects, it relates to means for equalizing the temperature of pebble delivered to the reaction chamber of pebble heater apparatus. In another of its more specific aspects, it relates to the conversion of hydrocarbons in pebble heater apparatus.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases or for the pyrolysis of hydrocarbons to produce various products, such as ethylene and acetylene, as well as for other reactions and purposes. Conventional pebble heater-type apparatus includes two refractory-lined contacting chambers disposed one above the other and connected by at least one uninterrupted refractory-lined passageway or pebble throat of relatively narrow cross section.

Refractory solids of flowable size and form, called "pebbles," are in conventional apparatus passed continuously and contiguously from the upper end of the pebble heating chamber through the system to the lower end of the reaction chamber, flowing by gravity through the uppermost chamber, the throat and the lowermost chamber, and are then conveyed to the top of the uppermost chamber to complete the cycle.

Solid heat exchange material which is conventionally used in pebble heater-type apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between ¼ and ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well at high temperatures, some withstanding temperatures up to about 4000° F. Pebbles which are used may be either inert or catalytic as used in any selected process.

The pebbles are heated in one of the chambers, preferably the upper one, by direct contact therein with hot gases, usually combustion products, to temperatures generally in the range of 1400° F. to 3200° F. The hot pebbles are then gravitated into a reactor chamber where they are contacted with a fluid to be superheated or reacted, as the case may be. In conventional apparatus, gas flow patterns in the pebble heating chamber are such that pebbles of decidedly different temperatures are gravitated from the pebble heating chamber through the pebble throat into the reaction chamber as distinct unmixed, but contiguous pebble streams. This uneven temperature of pebbles results in zones of different temperature within the reaction zone. The result of this type of operation is that non-uniform reaction or heating of the gaseous material is obtained in the lower chamber. Generally, pebble inlet temperatures in the lower chamber are about 100° F. to 200° F. below the highest temperature of the pebbles within the first chamber. In processes for the production of ethylene from light hydrocarbons such as ethane, propane, or butane the pebble temperature in the reaction chamber is usually in the range of 1200° F. to 1800° F. For the production of acetylene by pyrolysis of hydrocarbons, temperatures in the range of 1600° F. to 3000° F. are desirable.

As pointed out above, considerable trouble has been encountered in the operation of pebble heater apparatus for the reason that pebbles which are heated in the pebble heating chamber are not all heated to uniform temperature. For this reason, the pebbles which are introduced into the upper end portion of the reaction chamber lack the desired uniformity of temperature which would give the best reaction of feed within that reaction chamber. The result has been that a portion of the feed stock has been overcracked and a portion of the feed stock has been undercracked by reason of the contact with pebbles heated to temperatures above and below that desired for proper reaction of the feed. This difficulty in obtaining uniform temperatures of pebbles within the pebble heating chamber is due principally to the fact that the pebble heating chamber is one of large cross-section, and the gas flow patterns within such a chamber containing a contiguous gravitating pebble mass are such as to permit a considerably greater contact time between gas and pebbles in one section of the chamber than is obtained in another section of the same chamber.

Each of the objects of this invention is attained by at least one of the aspects of the invention.

An object of this invention is to provide improved pebble heater apparatus. Another object of the invention is to provide a zone intermediate the pebble heating and reaction zones in which all pebbles gravitating from the pebble heating chamber are positively mixed and are reconcentrated so as to obtain conduction heating therein. Another object of the invention is to provide means for heating pebbles in the pebble throat by convection. Another object of the invention is to provide a method for obviating temperature differentials of pebbles within the connecting throat between the pebble heater chamber and the reaction chamber. Another object of the invention is to provide an improved method for reacting hydrocarbons in pebble heater apparatus. Other and further objects and advantages will be apparent to those skilled in the art upon study of the accompanying discussion and the drawings.

Broadly speaking, this invention comprises means for obtaining a discontinuous mixed pebble phase within a portion of the pebble throat between the pebble heater chamber and the reaction chamber. That discontinuous phase is obtained by means of a flow controller such as a gate-type valve. The gate-type valve is preferably positioned in the upper end portion of the pebble throat. Positive mixing of the pebbles downstream of the valve is preferably obtained by means of overlapping baffles which cause the pebbles to be tumbled together in a random manner in their descent through the discontinuous phase. Other types of baffles may also be utilized to obtain random mixture of the pebbles within the pebble throat, such as grills, grates or screens vertically spaced apart within the throat. A contiguous or continuous pebble phase is formed downstream of the baffles and provides a soaking zone in which pebbles of different temperatures transmit or take up heat from adjoining pebbles so as to approach a more nearly equal temperature. Additional heat carrying gas is contacted with the pebbles in the soaking zone so as to aid in obtaining more uniform temperature thereof. The additional heat carrying gas is one having a relatively high heat capacity such as steam or hydrogen. It is known that very high heat transfer coefficients can be attained by means of convection whereas low heat transfer coefficients are available by conduction alone. This high temperature gas thus serves as a medium for receiving heat from hot pebbles and passing it directly to cooler pebbles.

A mathematical study has established that when a large temperature gradient exists in the pebble bed at the exit of the heating chamber, the temperature cannot be equalized during the residence time in the pebble throat unless the hot and cold pebbles are mixed. Heating the pebbles in this manner results in delivering each of the pebbles to the upper end of the reactor at a temperature which is substantially the same as that of any other pebble, thereby obviating the difficulty of non-uniform pebble heating encountered when using the conventional type pebble heater system.

Better understanding of this invention will be obtained upon reference to the drawings.

Figure 1:
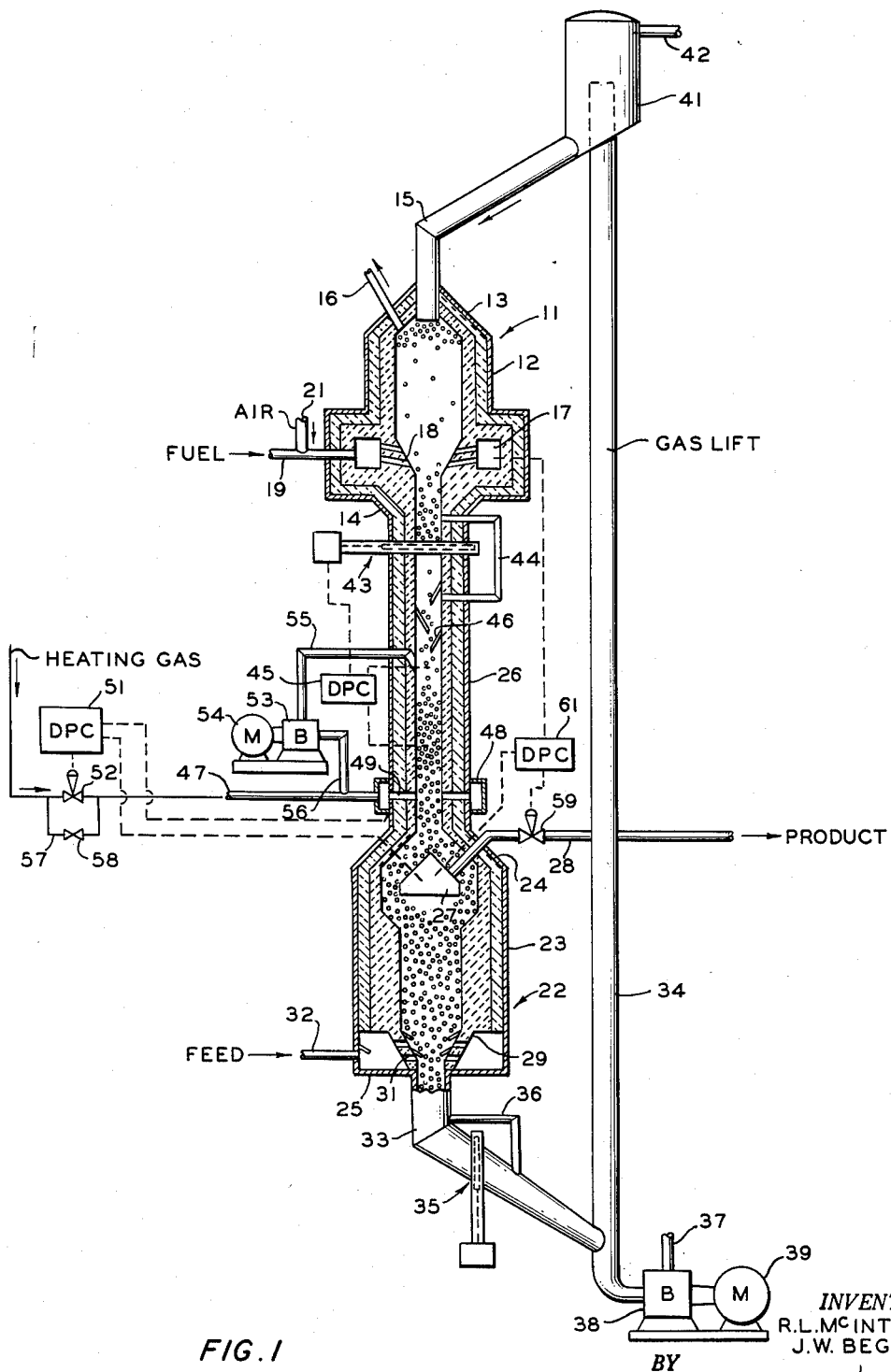
Figure 1 is a schematic flow diagram of the pebble heater system of this invention, showing the chambers and connecting throat in sectional elevation.

Referring particularly to the device shown in Figure 1 of the drawings, pebble heater chamber 11 comprises an upright elongated shell 12 closed at its upper and lower ends by closure members 13 and 14, respectively. Pebble inlet conduit 15 is provided in the upper end of chamber 11 and may be a single conduit as shown or may be a plurality of conduits distributed over the upper end of chamber 11. Effluent outlet conduit 16 extends from the upper end of chamber 11. Combustion chamber 17 is provided about the lower end portion of shell 12 and communicates with the chamber formed within shell 12 by means of conduits 18. Combustible materials are supplied to combustion chamber 17 by means of conduits 19 and 21. Although the pebble heater chamber has been shown as being provided with a peripheral type of combustion chamber, it should be noted that this invention does not reside in the specific type of pebble heating chamber utilized. A chamber utilizing a transverse refractory arch, perforated so as to permit the flow of heating gas from the combustion chamber into the pebble mass thereabove but so as to prevent flow of pebbles into the combustion chamber may be utilized if desired. It should also be noted that heating of the gaseous material may take place at the point outside of the combustion chamber described hereinabove and that the so called combustion chamber 17 may serve only as a gas distribution chamber.

Reaction chamber 22 comprises an upright elongated shell 23 closed at its upper and lower ends by closure members 24 and 25. Pebble throat 26 extends downwardly from the lower end portion of chamber 11 to the upper end portion of chamber 22. Although only a single throat is shown, a plurality of such throats may also be used. Baffle member 27 is provided within the upper end portion of chamber 22 so as to cause the pebbles flowing into chamber 22 to be diverted to the peripheral portion of the chamber formed within shell 23. Baffle member 27 is preferably formed as a cone which is open at its lower end. Effluent outlet conduit 28 extends through baffle 27 and the upper end portion of shell 23 so as to permit gaseous material to escape from the recess formed below and within baffle 27 to an outside collection zone. A conical bottom 29 is provided within chamber 22 and spaced from bottom closure 25 so as to form a gas distribution chamber therebetween. Conduits 31 extend through conical bottom 29 so as to provide means for the passage of gaseous feed from the gas distribution chamber into the mass of pebbles within reaction chamber 22. Feed inlet conduit 32 is connected to the gas distribution chamber. Pebble outlet conduit 33 extends downwardly from the lower end of chamber 22 and is connected at its lower end portion to the lower end portion of gas lift conduit 34. Pebble feeder 35 is provided in pebble outlet conduit 33 and may be any type of conventional pebble flow control means, such as a gate-type valve, as shown, a rotating table feeder, a vibratory feeder, a star-valve, or the like. By-pass conduit 36 extends from a point in pebble outlet conduit 33 upstream of feeder 35 to a point in outlet conduit 33 downstream of feeder 35. Elevator 34 may be any type of elevator desired, such as a gas-lift type elevator, as shown, bucket-type elevator, a screw-type elevator, or the like. Lift gas inlet conduit 37 is connected to the lower end of elevator conduit 34 through blower 38. Blower 38 is driven by motor 39, operatively connected thereto. Separator chamber 41 encompasses the upper end of elevator conduit 34, and is provided in its upper end portion with gaseous effluent outlet conduit 42 and is connected at its lower end to pebble inlet conduit 15.

Pebble flow controller such as a gate-type valve 43 is provided in the upper end of pebble throat 26. By-pass conduit 44 extends from a point within throat 26 upstream of valve 43 to a point downstream of valve 43. Differential pressure controller 45 is connected to a point within throat 26 upstream of the normal level of the contiguous pebble mass within that throat and is also connected to a point within the lower portion of the contiguous pebble mass formed in throat 26 preferably above a point of gas inlet thereto. Differential pressure controller 45 is operatively connected to valve 43. Baffles 46 are provided within the upper end portion of throat 26 immediately downstream of valve 43. These baffles preferably extend downwardly and inwardly from the side wall of throat 26 from alternate sides of that throat and are intermeshed so as to form a circuitous pebble path through an upper portion of throat 26. Heating gas inlet conduit 47 is connected to the interior of the lower end of throat 26 by means of header 48 and inlet conduit 49. Differential pressure controller 51 is connected to a point within header 48, or a point within throat 26 at substantially the inlet from that header, and is connected to the upper portion of the chamber formed within shell 23, preferably to the cavity formed within and below baffle 27. Differential pressure controller 51 is operatively connected to valve 52 in conduit 47 so as to control the supply of heating gas thereto. Blower 53 which is driven by motor 54 is connected to the interior of throat 26 so as to draw gaseous material therefrom at a point adjacent the lower baffle 46 by means of conduit 55. Blower 53 is also connected to conduit 47 so as to return gaseous material thereto by means of conduit 56. By-pass conduit 57 extends from conduit 47 upstream of valve 52 to a point in that conduit downstream of valve 52 and is provided with a flow control valve 58 therein. Flow control valve 59 is provided in effluent outlet conduit 28 and is operatively connected to differential pressure controller 61. Differential pressure controller 61 is operatively connected to the upper portion of the chamber formed within shell 23, preferably at the cavity formed within baffle 27 and is also connected to the lower end portion of the chamber formed within shell 12, preferably through combustion chamber 17, though the connection may be made within the chamber formed within shell 12.

In the operation of the device shown in Figure 1 of the drawings, pebbles are introduced into the upper portion of pebble heating chamber 11, forming a contiguous, gravitating, gas pervious mass therein. A combustible mixture is introduced into combustion chamber 17 where it is burned at a high temperature and the hot combustion gases are introduced into the lower portion of the gravitating gas pervious mass of pebbles through conduits 18. The hot gas passes upwardly through that gravitating pebble mass, heating pebbles in a direct heat exchange, and is removed from the upper end portion of that chamber through effluent outlet conduit 16. Pebble flow controller 43 is so adjusted as to permit only enough pebbles to flow therethrough as will obtain a discontinuous pebble phase within the upper end portion of pebble throat 26. The pebbles which flow through flow controller 43 gravitate upon the upper baffle member 46 and bounce or roll off onto the surface of a lower baffle member 46. Any number of such baffles may be utilized so as to obtain the desired mixing of those pebbles. Flow controller 35 downstream of reactor chamber 22 is so operated as to permit sufficient pebble flow to result in the formation of a contiguous pebble mass from a point in the lower portion of throat 26 through reaction chamber 22 to flow controller 35. Flow controller 35 is set so as to obtain a desired pebble flow through reaction chamber 22. This pebble flow will be dependent upon the particular reaction being carried on within the reaction chamber thus providing one control of the pebble temperature therein.

Heat transfer gas, such as steam is introduced into the lower end portion of throat 26 through conduit 47, header 48 and inlet conduits 49 in such quantity as to obtain flow of that gas upwardly through that portion of contiguous gravitating pebble mass formed within throat 26 thereabove and downwardly through the lower end portion of throat 26 into the chamber formed within shell 23 and into the cavity formed within baffle 27. The flow of this gas into the chamber formed within baffle 27 aids in sweeping reaction products from the surface of that baffle so as to prevent carbon lay-down thereon. The amount of fresh heating gas which is introduced through conduit 47 is substantially equal to that removed through the upper portion of chamber 22 and effluent outlet conduit 28. The portion of heating gas which flows upwardly in pebble conduit 26 is removed from that conduit by means of conduit 55, and is returned to conduit 47 by means of blower 53 and conduit 56. The pressure drop through a portion of the contiguous pebble mass formed within pebble conduit 26 is transmitted to differential pressure controller 45 which in turn controls the operation of flow controller 43 so as to increase or decrease the flow of pebbles therethrough and thus maintain the pebble interface at a relatively static position. Flow of gaseous material through flow controller 43 is substantially obviated by means of by-pass conduit 44 which permits any gaseous flow to by-pass that flow controller. By preventing gas from flowing through flow controller 43, it is possible to obtain a much closer control of pebble flow therethrough.

Hydrogen can be used as the heating gas introduced through conduit 47. Use of this gas may be desired at times because of its high heat transfer coefficient. It will be necessary in most instances, however, to maintain the pressures of chamber 11 and 22 in such balance that the hydrogen will flow to the pebble heating chamber rather than into the reaction chamber. Hydrocarbon feed such as ethane, propane, butane or the like is introduced into the lower portion of chamber 22 through inlet conduit 32, the gas distribution chamber and inlets 31. That feed gas flows upwardly through the gravitating mass of hot pebbles within the chamber in direct heat exchange therewith and is raised to reaction temperature. Resulting reaction products are collected in the chamber formed within baffle 27 and are removed, together with any heating gas which also collects therein through conduit 28. Pressures between the lower portion of pebble heating chamber 11 and the upper end portion of reaction chamber 22 are maintained by the adjustment of valve 59 in response to differential controller 61. Pebbles which are cooled in the reaction within chamber 22 pass downwardly through conduit 33 and pebble flow controller 35 to the lower end of elevator 34 wherein they are entrained in a stream of gas and are elevated to separator chamber 41 wherein the pebbles gravitate to the bottom of that chamber and through conduit 15 to the upper end of chamber 11. The lift gas is removed from the upper end portion of separator chamber 41 through effluent outlet conduit 42.

Figure 2:
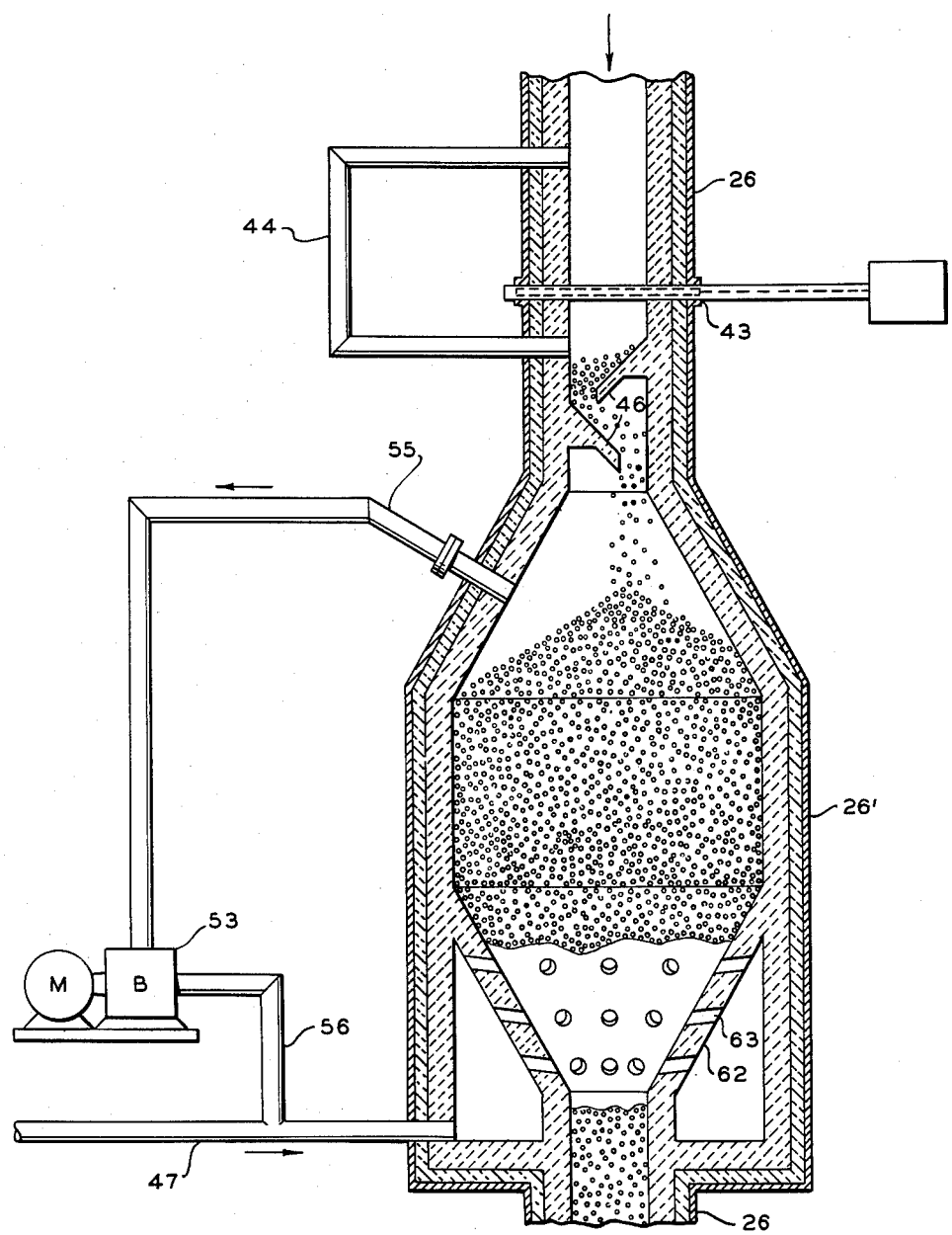
Figure 2 is a schematic representation of one modification of a pebble throat between the pebble heater and reaction chamber.

One modification of this invention is shown in Figure 2 of the drawings. That modification is in the structure of pebble throat 26. Flow controller 43 is provided in the upper end portion of throat 26 as is by-pass conduit 44. Baffles 46 are also provided in the upper portion of throat 26 downstream of flow controller 43. The lower end portion of conduit 26 is expanded as section 26' so as to provide a larger volume for soaking of the mixed pebbles. Conduit 55 is connected to the upper end portion of section 26' and to conduit 47 through blower 53 as described in connection with Figure 1 of the drawings. Gas distribution chamber is formed within the lower end portion of section 26' by means of a conical member 62 which extends downwardly and inwardly from the walls thereof to throat 26 at the bottom of that section. Conduits 63 are provided in member 62 so as to permit the passage of heating gas from the distribution chamber into the contiguous pebble mass within section 26'.

The operation of the device utilizing this modification is the same as that described in connection with Figure 1, the difference in the two devices being in the expansion of the lower portion of conduit 26 into 26' so as to permit a greater residence time for the pebbles within the soaking zone.

Many times, a temperature gradient of as much as 1000° F. will exist in the throat of a conventional pebble heater apparatus (e. g. 2200° F. at the wall of the throat and 1200° F. at the center). Thirty minutes are required for the pebbles in the 7-inch throat to approach a uniform temperature when the pebbles are not randomly mixed, steam at a mass velocity of 500 pounds per square foot per hour eliminates the temperature difference in randomly mixed pebbles in the throat in ten seconds. 6.6 seconds are required to remove those temperature differences when hydrogen is utilized at a mass velocity of 300 pounds per square foot per hour.

Various modifications of this invention will be apparent to those skilled in the art upon study of the accompanying disclosure. Such modifications are believed to be within the spirit and the scope of this invention.

We claim:

1. An improved pebble heater apparatus comprising a first closed upright shell having pebble inlet means in its upper end portion; gaseous material inlet means in one end portion of said shell; gaseous effluent outlet means in the end portion of said shell opposite the portion containing said gaseous inlet means; a second closed upright shell below first said shell; pebble outlet means in the lower end of said second shell; gaseous material inlet means in the lower end portion of said second shell; gaseous effluent outlet means in the upper end portion of said second shell; pebble conduit means extending from the lower end of said first shell to the upper end of said second shell; pebble flow control means in the upper end portion of said pebble conduit; a plurality of baffle means for mixing downflowing pebbles vertically spaced apart in the upper portion of said pebble conduit means and below said pebble flow control means; heating gas inlet means in the lower end portion of said pebble conduit means; gaseous material outlet means adjacent the lowermost of said baffles in said pebble conduit means; and elevator means extending from said pebble outlet means in said second shell to said pebble inlet means in said first shell.

2. The pebble heater apparatus of claim 1 wherein said baffles comprise members alternately extending downward and inward from opposite sides of said pebble conduit so as to overlap in the central portion of said pebble conduit.

3. The pebble heater apparatus of claim 1 wherein a differential pressure control is connected to said pebble conduit means at a point adjacent said heating gas inlet and to said pebble conduit means at a point adjacent said gaseous material outlet in said pebble conduit means and is operatively connected to said pebble flow control means in said pebble conduit.

4. The pebble heater apparatus of claim 1 wherein a gaseous material conduit extends from said pebble conduit means upstream of said pebble flow control means to a point in said pebble conduit means downstream of pebble flow control means.

5. The pebble heater apparatus of claim 1 wherein a flow control valve is provided in said gaseous effluent outlet means from said second shell; a differential pressure control is connected to the upper portion of the chamber formed within said second shell and to the lower portion of the chamber formed within said first shell and is operatively connected to said flow control valve in said gaseous effluent outlet means from said second shell.

6. The pebble heater apparatus of claim 1 wherein a flow control valve is provided in said heating gas inlet means to the lower end of said pebble conduit means; a differential pressure control is connected to the upper portion of the chamber formed within the said second shell and to said pebble conduit means adjacent heating gas inlet means and is operatively connected to said flow control valve in said gas inlet means to said pebble conduit means.

7. The pebble heater apparatus of claim 6 wherein said gaseous material outlet means from said pebble conduit means is connected at its downstream end to said heating gas inlet means downstream of said flow control valve; and a blower is provided in said gaseous material outlet means upstream of said heating inlet.

8. An improved pebble heater apparatus comprising a first closed upright shell having pebble inlet means in its upper end portion; gaseous material inlet means in one end portion of said shell; gaseous effluent outlet means in the end portion of said shell opposite the portion containing said gaseous material inlet means; a second closed upright shell below said first shell; pebble outlet means in the lower end of said second shell; gaseous material inlet means in the lower end portion of said second shell; gaseous effluent outlet means in the upper end portion of said second shell; pebble conduit means extending from the lower end of said first shell to the upper end of said second shell; pebble flow control means in the upper end portion of said pebble conduit means; a plurality of baffle means for mixing downflowing pebbles, in the upper portion of said pebble conduit means and below said pebble flow control means; heating gas inlet means in the lower end portion of said pebble conduit means; a flow control valve in said heating gas inlet means to said pebble conduit means; gaseous material outlet means from said pebble conduit means spaced above said heating gas inlet means to said pebble conduit means, said gaseous material outlet means being connected at its downstream end to said heating gas inlet means downstream of said flow control valve therein; a blower in said gaseous material outlet means from said pebble conduit means upstream of said heating gas inlet means; a first differential pressure control connected to said pebble conduit means adjacent heating gas inlet means and connected to said pebble conduit means adjacent said gaseous material outlet means from said pebble conduit means and operatively connected to said pebble flow control means; a second differential pressure control connected to the upper end portion of the chamber formed within said second shell and to said pebble conduit means adjacent said heating gas inlet means and operatively connected to said flow control valve in said heating gas inlet means to said pebble conduit means; a flow control valve in said gaseous effluent outlet means from said second shell; a third differential pressure control connected to the upper end portion of said chamber within said second shell and to said chamber within said first shell and operatively connected to said flow control valve in the effluent outlet means from said second shell; and elevator means extending from said pebble outlet means in said second shell to said pebble inlet means in said first shell.

9. The pebble heater apparatus of claim 8 wherein a gaseous material conduit extends from said pebble conduit means upstream of said pebble flow control means to said pebble conduit means downstream of said pebble flow control means.

10. The pebble heater apparatus of claim 8 wherein the upper end portion of said pebble conduit means is of a given cross section and contains said pebble flow control means and said baffles and the lower end portion of said pebble conduit means is of a cross section larger than that of the upper portion of said pebble conduit means.

11. A method for providing pebbles of uniform elevated temperature in a reaction chamber of pebble heater apparatus which comprises in combination the steps of heating pebbles to an elevated temperature in a pebble heating zone; gravitating said pebbles through a pebble conduit zone as a continuous and contiguous pebble mass to a pebble flow control zone; gravitating said pebbles through said pebble flow control zone as a discontinuous pebble phase; tumbling said pebbles in said discontinuous phase in random admixture forming a contiguous mass of the randomly admixed pebbles within said pebble conduit zone; introducing a gaseous heating material into the lower portion of said contiguous pebble mass within said pebble conduit zone and passing said heating gas upwardly therethrough in direct heating exchange with said pebbles; removing said heating gas from said pebble conduit zone at a point above said contiguous pebble mass therein; and gravitating said pebbles into said reaction zone as a substantially uniform temperatured contiguous pebble mass.

12. The process of claim 11 wherein the flow of heating gas to the lower end portion of said pebble conduit zone is controlled in accordance with a pressure differential between the upper end portion of said reaction zone and the lower end portion of said pebble conduit zone.

13. The process of claim 12 wherein the flow of pebbles as a discontinuous phase is controlled in response to a pressure differential between the lower portion of said pebble conduit zone and the portion of said pebble conduit zone containing said discontinuous phase of pebbles.

14. The process of claim 13 wherein a gaseous material is introduced into the lower end portion of said reaction zone and is passed upwardly through that zone in direct heat exchange with said uniformly heated pebbles therein and a heated gaseous effluent is removed from the upper end portion of said reaction zone; and the flow of heated gaseous effluent from said reaction zone is controlled in accordance with a pressure differential between the upper end portion of said reaction zone and the lower end portion of said pebble heating zone.

15. The process of claim 14 wherein said gaseous material comprises a hydrocarbon and same is cracked in said reaction zone.

16. The process of claim 11 including the steps of cracking a normally gaseous hydrocarbon in said reaction zone by direct heat exchange with said pebble mass and recovering the cracked effluent from said reaction zone.

17. An improved pebble heater apparatus comprising a first closed upright shell having pebble inlet means in its upper end portion; gaseous material inlet means in one end portion of said shell; gaseous effluent outlet means in the end portion of said shell opposite the portion containing said gaseous inlet means; a second closed upright shell below first said shell; pebble outlet means in the lower end of said second shell; gaseous material inlet means in the lower end portion of said second shell; gaseous effluent outlet means in the upper end portion of said second shell; pebble conduit means extending from the lower end of said first shell to the upper end of said second shell; pebble flow control means in the upper end portion of said pebble conduit; pebble mixing means in said pebble conduit spaced downwardly from said pebble flow control means; heating gas inlet means in the lower end portion of said pebble conduit means; gaseous material outlet means adjacent the lower end of said pebble mixing means; and elevator means extending from said pebble outlet means in said second shell to said pebble inlet means in said first shell.

References Cited in the file of this patent

UNITED STATES PATENTS

| | | |
|---|---|---|
| 2,248,196 | Plummer | July 8, 1941 |
| 2,274,003 | Sheppard | Feb. 24, 1942 |
| 2,348,699 | Tuttle | May 9, 1944 |
| 2,490,828 | Newton | Dec. 13, 1949 |
| 2,514,722 | Robinson | July 11, 1950 |
| 2,518,842 | Weber | Aug. 15, 1950 |
| 2,572,664 | Robinson | Oct. 23, 1951 |
| 2,630,373 | Grossman | Mar. 3, 1953 |